United States Patent [19]
Kumagai et al.

[11] Patent Number: 5,962,309
[45] Date of Patent: Oct. 5, 1999

[54] EXTRUDED FOAMED POLYOLEFIN RESIN CARRIER FOR MICROORGANISMS IN A FLUIDIZED BED

[75] Inventors: Shinya Kumagai; Kazuyasu Tanaka, both of Osaka, Japan

[73] Assignee: Tsutsunaka Plastic Industry Co., Ltd., Osaka, Japan

[21] Appl. No.: 09/006,215

[22] Filed: Jan. 13, 1998

[30] Foreign Application Priority Data

Jan. 14, 1997 [JP] Japan .................................. 9-004491
Jun. 2, 1997 [JP] Japan .................................. 9-144161

[51] Int. Cl.$^6$ .............................. C12M 1/14; C02F 3/00; C12N 11/08; C12N 11/04
[52] U.S. Cl. .................. 435/299.1; 210/615; 210/616; 210/617; 435/180; 435/182; 435/289.1; 435/262; 435/262.5
[58] Field of Search .................................. 435/174, 177, 435/180, 182, 289.1, 299.1, 262, 262.5; 210/615, 616, 617

[56] References Cited
FOREIGN PATENT DOCUMENTS

| | | |
|---|---|---|
| 0 186 125 | 7/1986 | European Pat. Off. . |
| 0 685 432 | 12/1995 | European Pat. Off. . |
| 40 19 577 | 1/1992 | Germany . |
| 59-28391 | 7/1984 | Japan . |
| 8-173984 | 7/1996 | Japan . |

*Primary Examiner*—David M. Naff
*Attorney, Agent, or Firm*—Armstrong, Westerman, Hattori, McLeland & Naughton

[57] ABSTRACT

A microorganism holding carrier for a fluidized bed is provided that includes an extruded foamed article having continuous cells and independent cells. The article is composed of a polyolefin resin as a main component. The continuous cells include open-cells which are opened to at least two portions of a surface of the article and a semi-open cell which are opened to only one portion of the surface of the article. A ratio of the total volume of the continuous cells to the total volume of the extruded foamed article (a volume ratio of the continuous cells) falls within a range of from 20% to 70%. Further, a ratio of the total volume of the open-cells to the total volume of the continuous cells (a volume ratio of open-cells) is 20% or more. The article may have an apparent density of 0.90 to 1.80 g/cm$^3$ and an apparent volume from $2.0 \times 10^{-3}$ to 5.0 cm$^3$, and be in the shape of a column, or a tube having an outer diameter of 2 to 20 mm and a thickness of 5 to 30% of the outer diameter. During foam-extruding, a cylinder temperature of 180° C. to 250° C. and a die temperature of 200° C. to 250° C. are preferred. The polyolefin resin may include additives such as an inorganic filler, a foaming agent, and a blowing assistant for controlling foaming temperature of the foaming agent.

16 Claims, 2 Drawing Sheets

EXTRUDED FOAMED POLYOLEFIN RESIN CARRIER FOR MICROORGANISMS IN A FLUIDIZED BED

BACKGROUND OF THE INVENTION

This application claims priority to Japanese Patent Applications Nos. Hei 9(1997)-4491 and Hei 9(1997)-144161, each disclosure of which is incorporated by reference in its entity.

1. Field of the Invention

The present invention relates to a microorganism holding carrier for a fluidized bed for use in a biochemical reactor used in a sewage treatment facility which treats sewage by utilizing microorganisms.

2. Description of the Related Art

A fluidized-bed biochemical reactor used in a sewage treatment facility that utilizes biochemical reactions clarifies sewage by fluidizing carriers. These carries are thrown into a treatment tank by an air-seasoning operation to hold sewage-treating microorganisms, i.e., activated sludge, on the carriers.

Generally required features of the microorganism holding carrier for use in a fluidized bed in this kind of sewage treatment facility are that the carrier is: (1) superior in fluidity so as to quickly become familiar with water to uniformly fluidize in the treatment tank; (2) porous so as to be easily held by microorganisms; and (3) strong enough to endure a fluidization, i.e., superior in durability such as an abrasion resistance.

Under these circumstances, diatomaceous earth, a porous inorganic substance, is conventionally used as a microorganism holding carrier. However, because such a carrier is about 2.0 g/cm$^3$ in apparent density, which is much heavier than water, a strong mixing power is required to fluidize them, which causes an increase of carrier fluidizing energy, causing an increase of running cost. Further, because such a diatomaceous earth as a carrier is easily worn when fluidized, it is hard to maintain the initial configuration for a long period, thus lacking durability.

Recently, a plastic carrier made of a synthetic resin which is similar to water in density, thereby requiring a decreased fluidizing energy, and which is superior in durability, has been developed and has rapidly become popular.

In manufacturing this kind of synthetic resin carrier, generally adapted is a method utilizing a porous-making technique such as a dropping forming method or a sintering method, or a method utilizing an extruding foaming method.

However, in manufacturing a microorganism holding carrier by utilizing a porous-making technique such as a dropping forming method or a sintering method, it is difficult to attain high productivity and is also difficult to use cheaper materials due to the limited synthetic resin materials. This increases the manufacturing cost.

In case of utilizing an extruding foaming method, though the productive efficiency may be improved, the extruding foaming method in manufacturing the carrier has not yet been fully established. As a result, synthetic resin carriers made by a conventional extruding foaming method are of uneven quality, causing problems such as bad water-familiarity or bad fluidity.

On the other hand, in recent years, it has been suspected and is now a social problem that a waste disposal of spent plastic goods or articles may exert a harmful influence on the environment. This problem is not an exception in the biochemical reactor technical field. Thus, it is now strongly required to use a synthetic resin carrier which exerts less harmful influence on the environment.

SUMMARY OF THE INVENTION

It is therefore an object of the present invention to provide a microorganism holding carrier for use in a fluidized bed which solves the above-mentioned problems, and which has a good water-familiarity and an excellent fluidity. It is an additional object of the invention to provide a microorganism holding carrier which also is low in price and excellent in durability and exerts less harmful influence on the environment.

The inventors have conducted research and found the fact that, in a resin microorganism holding carrier for a fluidized bed, a porous structure (cellular structure) used in the carrier is highly concerned with elements for improving water-familiarity and fluidity, and the research has revealed a specific cellular structure which can further improve water-familiarity and fluidity. Based on the specific cellular structure, the inventors have conducted experiments and researches repeatedly. As a result, the inventors have found the most appropriate structural elements of the synthetic resin carrier which enables the above objects to be obtained.

According to the present invention, there is a provided microorganism holding carrier for use in a fluidized bed that comprises an extruded foamed article having independent cells and continuous cells, the article being composed of a polyolefin resin as a main component. The continuous cells include open-cells which are opened to at least two portions of a surface of the article and a semi-open cells which are opened to only one portion of the surface of the article, wherein a ratio of a total volume of the continuous cells to the total volume of the extruded foamed article (hereinafter referred to as "a volume ratio of the continuous cells") falls within a range of from 20% to 70%, and wherein a ratio of the total volume of the open-cells to the total volume of the continuous cells (hereinafter referred to as "a volume ratio of open-cells") is 20% or more.

In the carrier according to the present invention, because water can smoothly permeate into a number of open-cells and semi-open cells, the carrier is superior in water-familiarity, thereby enabling quick and excellent fluidity. Therefore, adopting the carrier as a biochemical reactor for use in a fluidized bed used in a sewage treatment facility which treats sewage by utilizing microorganisms, enables quick holding microorganisms, which in turn improves sewage treating efficiency.

Because the carrier according to the present invention is a synthetic resin extruded foamed article, the carrier can be made by an extrusion forming method which is suitable for mass production, thus reducing the manufacturing cost.

Because the carrier according to the present invention is composed of a polyolefin resin as a main component, the carrier is superior in abrasion resistance and has sufficient durability. Further, as compared with a polyvinyl chloride resin carrier, the carrier according to the present invention can be disposed without causing any trouble and can reduce harmful influence on the environment by disposing of the spent carriers.

Other objects and features will be apparent from the following detailed description of the invention with reference to the attached drawings.

BRIEF DESCRIPTION OF THE DRAWINGS

The present invention will be more fully described and better understood from the following description, taken with the appended drawings, in which:

FIGS. 4A and 4B are cross-sectional views each showing a column-shaped microorganism holding carrier for use in a fluidized bed according to the present invention, wherein FIG. 4A is a front cross-sectional view; and FIG. 4B is a side cross-sectional view;

DETAILED DESCRIPTION OF THE PREFERRED EMBODIMENTS

Figure 1:
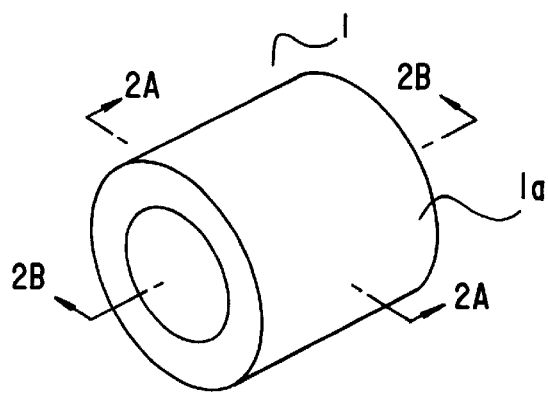
FIG. 1 is a perspective view showing a tube-shaped microorganism holding carrier for use in a fluidized bed according to the present invention.

Preferred embodiments of the present invention will now be described, in detail, with reference to the accompanying drawings. Like reference numerals in the drawings depict like embodiments.

The carrier according to the present invention comprises an extruded foamed article having continuous cells, i.e., continued bubble-like cells, the article being composed of a polyolefin resin as a main component.

The polyolefin resin as a main component of the carrier is suitable for extrusion, is easy to dispose and is also inexpensive. Thus, a polyolefin resin is preferably used in the present invention. To surely obtain these effects and advantages of the invention, it is preferable to use a polypropylene resin among polyolefin resins. Those skilled in the art appreciate that other polyolefins may be used in the invention.

Figure 2A:
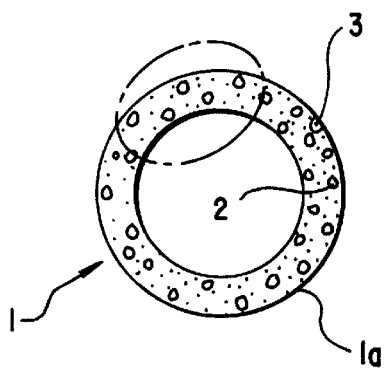
FIG. 2A is a cross-sectional view taken along the line A—A in FIG. 1.
Figure 2B:
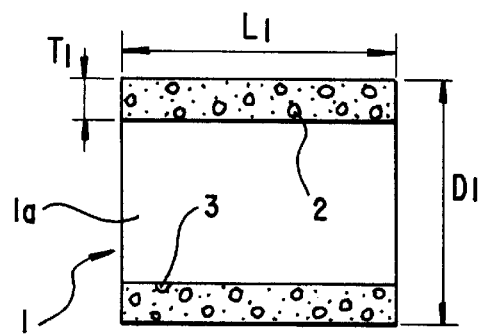
FIG. 2B is a cross-sectional view taken along the line B—B in FIG. 1.
Figure 4A:
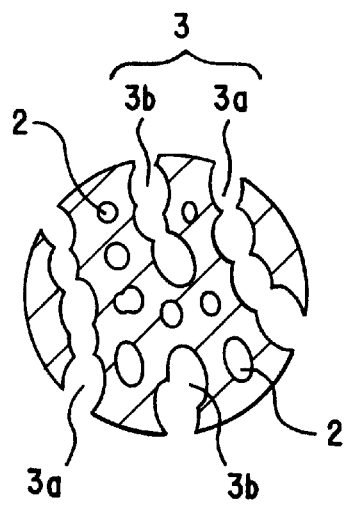
Figure 4B:
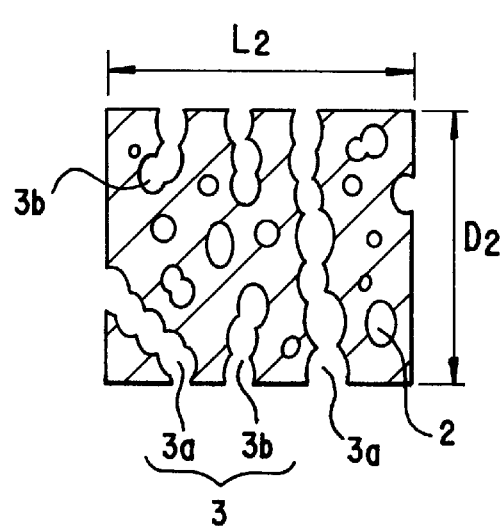

The configuration of the carrier according to the present invention is not especially limited, and the carrier may be, for example, a hollow article like a tube, or a non-hollow grain-like article such as a circular column, an elliptical column, a half cut-out circular column, a prism (dice shape or the like), a plate or an arc-shaped plate. It is particularly preferred to form a hollow tube as shown in FIGS. 1, 2A and 2B, or a non-hollow grain-like article such as a circular column, pellet and the like as shown in FIGS. 4A and 4B. The selection between a tube-shaped carrier 1 and a column-shaped carrier 1 will be determined according to the purpose of the usage. For example, in a tube-shaped carrier 1, anaerobic microorganisms are easily held on the inner surface of the tube-shaped carrier and aerobic microorganisms are easily held on the outer surface thereof. Thus, in such a case that both anaerobic microorganisms and aerobic microorganisms are utilized, the tube-shaped carrier 1 is preferably used. In a non-hollow grain article such as a column shaped article, anaerobic microorganisms are hardly held thereon and aerobic microorganisms are easily held on the outer surface thereof. Thus, in such a case that aerobic microorganisms are mainly utilized, a non-hollow grain-like carrier 1 is preferably used.

Figure 3:
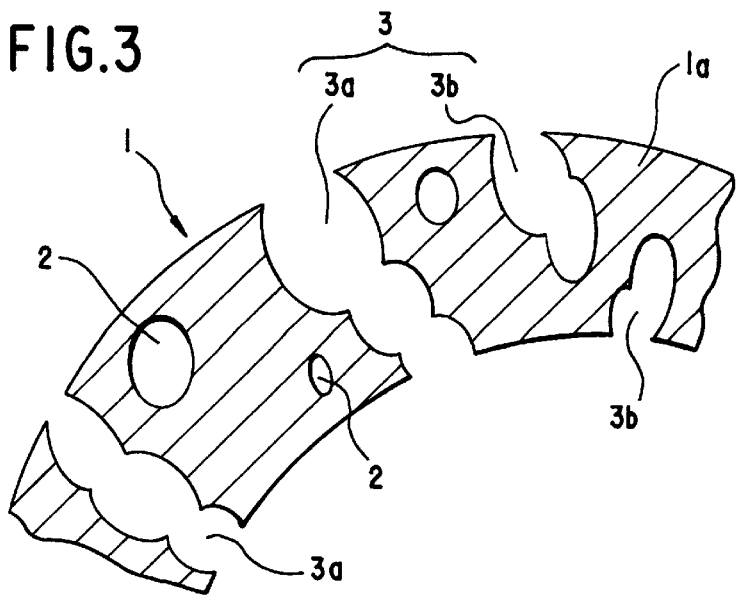
FIG. 3 is an enlarged cross-sectional view showing a portion surrounded by a dot-dash line in FIG. 2A.

The carrier 1 according to the present invention comprises an extruded foamed article 1a made by an extruding foaming method which will be described in detail below. Cells 2, 3 formed in the foamed article 1a include independent cells 2 each completely surrounded by a cell wall as shown in FIGS. 3, 4A and 4B and continuous cells 3 each opened to at least one portion of the surface of the foamed article 1a. The continuous cells 3 include open-cells 3a each opened to at least two portions of the surface of the foamed article 1a and semi-open cells 3b each opened to only one portion of the surface of the foamed article 1a.

The carrier 1 according to the present invention includes a number of continuous cells 3, and a ratio of the total volume of the continuous cells 3 to the total volume of the extruded foamed article 1a (continuous cells volume ratio) should fall within a range of from 20% to 70%. It is preferable that the lower range is 40% or more and the upper range is not larger than 60%. If the continuous cells volume ratio (a porous ratio) is below the lower limit, it is not preferable because, when the carrier 1 is thrown into a treatment tank of a sewage treatment facility, water does not permeate enough into the carrier 1 and, therefore, a preferable fluidity can not be obtained. In addition, there is a possibility that the microorganism holding efficiency may decrease. On the other hand, if the continuous cell volume ratio exceeds the upper limit, it is not preferable because the strength of the carrier decreases and therefore, sufficient durability can not be obtained.

In the present invention, a ratio of the total volume of the open-cells to the total volume of the continuous cells (an open-cell volume ratio) should be 20% or more, preferably 30% or more. The open-cell 3a has more effective water infiltration capacity than the semiopen-cell 3b. If the open-cell volume ratio is below the lower limit, it is not preferable because, when the carrier 1 is thrown into a treatment tank of a sewage treatment facility, the carrier 1 is poor in water-familiarity, and thus, it is hard to obtain a preferable fluidity. By the way, even if the open-cell volume ratio becomes larger, there will be no disadvantage as a carrier. However, it is very difficult to manufacture a foamed article 1a having an open-cell volume ratio of 80% or more with high quality by an extruding foaming method.

In the present invention, an apparent density of the extruded foamed article 1a, i.e., a density of the extruded foamed article 1a from which a volume of the continuous cells are deducted, is one of the factors used to determine the fluidity performance of the carrier 1. If the apparent density is too low, when the carrier 1 is thrown into sewage filled in a treatment tank, the carrier 1 floats in an upper layer of the sewage. Thus, there is a fear that it is hard to fluidize evenly even if a strong rotational flow is given. On the other hand, if the apparent density is too high, a strong rotational flow will be required to fluidize them evenly. In addition, there is a fear that it will be hard to collect these carriers because they sink to the bottom of the treatment tank when the rotational flow stops.

In the present invention, other than the above-mentioned apparent density, the configuration or volume of the carrier 1 also greatly effects the fluidity performance of the carrier 1. A tube-shaped carrier 1 as shown in FIGS. 1, 2A and 2B has a large flow resistance in comparison with a non-hollow grain article 1 such as a column or the like as shown in FIGS. 4A, 4B. The larger the volume becomes, the larger the flow resistance becomes. Therefore, in case of a tube-shaped large volume carrier 1, because the flow resistance is large, it is preferable that the apparent density is set to be small so as to keep its suitable dispersion. To the contrary, in case of a non-hollow small volume grain-like article 1, because the flow resistance is small, it is preferable that the apparent density is set to be large so as to keep its suitable dispersion.

As a result, when the carrier 1 is a tube-shaped article as shown in FIGS. 1, 2A and 2B, and the apparent volume, i.e., the volume of the article from which the volume of the continuous cells 3 is deducted, is relatively large, such as from $2.0 \times 10^{-3}$ to 5.0 cm$^3$, it is preferable that the apparent density is set to be from 0.90 to 1.40 g/cm$^3$, more preferably the lower limit is set to be not smaller than 0.94 g/cm$^3$ and the upper limit is set to be not larger than 0.98 g/cm$^3$. In this case, the bulk density, i.e., a density based on the carrier volume including the whole, or independent cells, is set to be from 0.30 to 0.70 g/cm$^3$. Those skilled in the art are capable of designing a carrier 1 having the aforementioned apparent density and bulk density using the guidelines provided herein.

When the carrier 1 is a non-hollow grain-like article such as a column-shaped article, pellet, or the like, as shown in FIGS. 4A and 4B, and the apparent volume is relatively small such as from $5.0 \times 10^{-4}$ to $4.0 \times 10^{-2}$ cm$^3$, it is preferable that the apparent density is set to be from 1.10 to 1.80 g/cm$^3$, more preferably the lower limit is set to be not smaller than 1.20 g/cm$^3$ and the upper limit is set to be not larger than 1.70 g/cm$^3$. In this case, the bulk density preferably is set to be from 0.40 to 0.80 g/cm$^3$.

However, in the present invention, because configuration or volume of the carrier 1 is not specifically limited, the preferable range of the apparent density is a range including all of the above-mentioned range, i.e., a range of from 0.90 to 1.80 g/cm$^3$.

In the present invention, when the carrier 1 is formed in the shape of a tube, as shown in FIG. 2B, it is preferable that the outer diameter D1 is set to be from 2 to 20 mm, more preferably not smaller than 4 mm, and not larger than 10 mm. If the outer diameter D1 is below the lower limit, it is hard to produce a foamed article 1a having a foam structure in accordance with the present invention. On the other hand, if exceeds the upper limit, a flow resistance in water becomes large, resulting in poor fluidity.

Further, it is preferable that the thickness T1 of the carrier 1 is set within a range of from 4 to 40% of the outer diameter D1, more preferably not smaller than 5%, and not larger than 30%. If the thickness is below the lower limit, the lack of strength makes it difficult to maintain the configuration, and an excess load to an extruder may occur during extrusion. On the other hand, if the thickness exceeds the upper limit, a number of open-cells may not be formed, resulting in a low open-cell volume ratio.

Generally, in extrusion, the larger the outer diameter D1 becomes, the slower the extrusion speed becomes. In forming the cellular structure in accordance with the present invention, because extrusion speeds, that are too fast, cause a skin layer on the surface of the extruded article, the slower the extrusion speed become, in other words, the diameter becomes larger, then a thinner thickness T1 can be obtained. Therefore, in the present invention, it is appropriate that the thickness T1 is specified in relation to the outer diameter D1. Preferred values for the thickness may be defined as follows. The thickness T1 may preferably be set to be from 0.2 mm to 2.0 mm, more preferably the lower limit is set to be not smaller than 0.3 mm, the upper limit not larger than 1.5 mm.

It is preferable that the length L1 of the carrier 1 is set to be from 50% to 200% of the outer diameter D1, more preferably not smaller than 100%, and not larger than 150%. If the length is too long, a flow resistance in water becomes larger, causing a lack of fluidity. If the article 1 is cut in short length, cracks may be occur in the article, resulting in a poor quality. Preferred values of length L1 may be defined as follows. The length L1 of the carrier 1 may preferably be set to be from 1 mm to 40 mm, more preferably not smaller than 4 mm, and not larger than 20 mm.

In the present invention, when the carrier 1 is formed in the shape of a grain article such as a short column or the like, as shown in FIG. 4B, it is preferable that the outer diameter D2 is set to be from 0.8 mm to 3.0 mm, preferably not smaller than 1.0 mm, and not larger than 2.0 mm. If the outer diameter D2 is below the lower limit, it is hard to produce a foamed article 1a having a foam structure in accordance with the present invention. On the other hand, if the outer diameter exceeds the upper limit, the flow resistance in water becomes large, resulting in poor fluidity.

It is preferable that the length L2 of the carrier 1 is set to be from 30% to 300% of the outer diameter D2, more preferably not smaller than 50%, and not larger than 200%. If the length exceeds the upper limit, a flow resistance in water becomes larger, causing a lack of fluidity. If the article 1 is cut in short length, cracks may be generated in the article, resulting in a poor quality. If defined by preferred values, the length L2 of the carrier 1 may be set to be from 0.24 mm to 9.0 mm, more preferably not smaller than 0.4 mm, and not larger than 4.0 mm.

The above-mentioned carrier 1 may, for example, be made by the following method.

First, a resin composite for forming the carrier preferably is prepared by combining a polyolefin resin as a main component with an inorganic filler, two types of foaming agents whose foaming temperatures are different from each other, a blowing assistant if required, and an appropriate additive.

The inorganic filler combined with the above resin composite is not specifically limited and any kind of filler can be used. It is preferable to use a filler which is inexpensive and chemically stable. For example, calcium carbonate, barium sulfate, zeolite, titanium oxide, kalium titanate, aluminum hydroxide, and the like, may preferably be used. Needless to say, two or more types may be used together.

The amount of the inorganic filler is preferably to be set from 5 to 400 parts by weight for 100 parts by weight of a polyolefin resin as a main component. When a tube-shaped carrier 1 as shown in FIGS. 1, 2A and 2B is to be produced, the amount of the inorganic filler preferably falls within a range of from 5 to 50 parts by weight, more preferably the lower limit is not smaller than 8 parts by weight and the upper limit is not larger than 20 parts by weight. When a grain-shaped carrier 1 as shown in FIGS. 4A and 4B is to be produced, the amount of the inorganic filler preferably falls within a range of from 5 to 400 parts by weight for 100 parts by weight of the polyolefin resin. More preferably the lower limit is not smaller than 10 parts by weight and the upper limit is not larger than 200 parts by weight. If the amount exceeds the range, it is difficult to obtain an apparent density similar to water, resulting in a poor fluidity.

In the present invention, it is preferable that the density (material density) of the melt component in which an inorganic filler is combined with a polyolefin resin as a main component is set to fall within a range of from 0.90 to 2.20 g/cm$^3$. Concretely, when a tube-shaped carrier 1 is to be produced, the density is set to fall within a range of from 0.90 to 1.20 g/cm$^3$, preferably the lower limit not smaller than 0.95 g/cm$^3$, the upper limit not larger than 1.00 g/cm$^3$. When a grain-shaped carrier 1 is to be produced, the density is set to fall within a range of from 1.10 to 2.20 g/cm$^3$, preferably the lower limit not smaller than 1.20 g/cm$^3$, the upper limit not larger than 2.00 g/cm$^3$. If the density is too low, even if the density is adjusted by a foaming agent, it will be difficult to obtain a certain apparent density required to attain a preferable fluidity. On the other hand, if the density is too high, an excessive foaming during the extrusion is required to obtain an appropriate apparent density, resulting in an unstable extruding.

As the two types of foaming agents to be added to the resin component, foaming agents whose foaming (resolving) temperatures are different from each other are used.

Among two different types of foaming agents, dinitrosopentamethylenetetramine(hereinafter referred to as DPT) is preferably used as one of the foaming agents which has a foaming temperature lower than a forming temperature of the other foaming agent (a lower temperature resolving type foaming agent), and azodicarboamide (hereinafter referred to as ADCA) is preferably used as one of the other foaming agents which has a foaming temperature higher than a temperature of the other foaming agent (a higher temperature resolving type foaming agent). Those skilled in the art appreciate that other known foaming agents can be used in the invention, and they are capable of determining which agent to use in combination with other agents using the guidelines provided herein.

It is preferable that the amount of the DPT in a resin component for the carrier is 0.15 wt % based on the total weight of the composition (hereinafter referred to as wt %) or more, but not larger than 0.40 wt %, more preferably 0.20 wt % or more, but smaller than 0.31 wt %. If the amount is too much, a stable extrusion can not be performed, therefore a carrier having a cellular structure in accordance with the present invention can not be obtained. On the contrary, if the amount is too less, it is difficult to obtain an apparent density similar to water, resulting in a poor fluidity.

As for DPT, it is preferable that the average particle diameter (hereinafter referred to as 'particle diameter') is smaller than 10 μm, more preferably smaller than 9 μm. If the particle diameter is too large, a stable extrusion can not be performed. Therefore, it is difficult to obtain a predetermined carrier. However, even if the particle diameter is too small, there is no special demerit.

As for the amount of the ADCA, it is preferable that the amount in a resin composition for the carrier is 0.15 wt % or more, but smaller than 1.50 wt %, more preferably 0.2 wt % or more, but not larger than 0.31 wt %. If the amount exceeds the upper limit, a stable extrusion can not be performed, therefore it is difficult to obtain a predetermined carrier. On the other hand, if the amount is below the lower limit, it is difficult to obtain a predetermined apparent density, resulting in a poor fluidity.

As for the particle diameter of the ADCA, it is preferable that the particle diameter is 3 μm or larger, but smaller than 16 μm, more preferably the lower limit is 3 μm or more and the upper limit is smaller than 11 μm. If the particle diameter exceeds the upper limit, though the volume ratio of the continuous cells increases, the volume ratio of the open-cell decreases and therefore, it is difficult to obtain a predetermined carrier. On the other hand, if the particle diameter is below the lower limit, it becomes difficult to form a continuous cell and the ratio of the independent cells becomes larger. Therefore, it is difficult to obtain a predetermined carrier.

In the present invention, a blowing assistant for controlling the foaming temperature of the foaming agent may preferably be added to the resin composition for the carrier. As such a blowing assistant, especially, urea preferably is used.

The amount of urea in the resin component is preferably 0.15 wt % or more, but less than 0.40 wt %, more preferably, the upper limit is less than 0.31 wt %. If the amount of urea exceeds the upper limit or is below the lower limit, the continuous cell volume ratio decreases, resulting in a poor fluidity.

If necessary, an appropriate additive may be added to the resin component for the carrier. The skilled in the art are aware of the various additions that can be added, and they are capable of adding an appropriate additive using the guidelines provided herein.

The carrier according to the present invention can be obtained by foam-extruding the above-mentioned resin composition through a known extruder. During the extrusion, the resin composition typically is melt and mulled in a cylinder by a screw, the temperature gradually increases, and the foaming agent gradually decomposes. Just after the resin composition is extruded, it expands to generate foams in the extruded article. In this case, in the present invention, foaming timing is different between the lower temperature resolving type foaming agent such as a DPT and the higher temperature resolving type foaming agent such as a ADCA. That is, the lower temperature resolving type foaming agent foams first, thereafter the higher temperature resolving type foaming agent foams. The higher temperature resolving type foaming agent is gradually heated by outside heat from a cylinder or a die of the extruder to attain an activated state, and then it rapidly foams due to an addition of inner heat, i.e., heat generated when the lower temperature resolving type foaming agent foams, thereby a number of the desired continuous cells are formed. Thus a cellular structure in accordance with the present invention is formed by the synergetic effect of those different type forming agents.

The extruding condition is not particulary limited, and therefore it may be set depending on the desired product. For example, it is preferable that the cylinder temperature falls within a range of from 180° C. to 250° C., and the die temperature falls within a range of from 200° C. to 250° C. Skilled artisans are capable of setting the extruding conditions using the guidelines provided herein.

In this method, because heat which is generated when the lower temperature resolving type foaming agent foams accelerates to foam the higher temperature resolving type foaming agent, it is preferable to use a lower temperature resolving type foaming agent which generates a great deal of heat when it foams. Concretely, it is preferable that the heat value (heat of decomposition) when the lower temperature resolving type foam agent foams is 80 kcal/mol or more, more preferably 150 kcal/mol or more. The above-mentioned DPT (MW=186), which is used as a lower temperature resolving type foaming agent, has a heat of decomposition of 155 kcal/mol (833.3 cal/g), which fits the above condition on the heat value.

For reference, the heat of decomposition of the above-mentioned ADCA (MW=166), which is used as a higher temperature resolving type foaming agent, is 10 kcal/mol (86.2 cal/g).

Embodiments according to the present invention and comparisons for evaluating the effects of the Examples, will now be described in detail in the following examples.

TABLE 1

| Example No. | | 1 | 2 | 3 | 4 | 5 | 6 | 7 | 8 | 9 |
|---|---|---|---|---|---|---|---|---|---|---|
| PP resin amount (parts by weight) | | 100 | 100 | 100 | 100 | 100 | 100 | 100 | 100 | 100 |
| Inorganic filler amount (parts by weight) | | 10 | 10 | 10 | 10 | 10 | 10 | 10 | 10 | 10 |
| ADCA amount (wt %) | 2 μm diameter | — | — | — | — | — | — | — | — | 1.00 |
| | 3 μm diameter | 0.15 | 1.00 | — | — | 1.40 | — | 0.15 | — | — |
| | 10 μm diameter | — | — | 1.00 | 1.00 | — | — | — | — | — |
| | 14 μm diameter | — | — | — | — | — | 1.00 | — | — | — |
| | 15 μm diameter | — | — | — | — | — | — | — | 0.15 | — |
| DPT amount (wt %) | 1 μm diameter | 0.15 | 0.30 | 0.30 | — | 0.30 | — | — | 0.15 | 0.30 |
| | 8 μm diameter | — | — | — | 0.30 | — | 0.30 | — | — | — |
| | 10 μm diameter | — | — | — | — | — | — | 0.15 | — | — |
| Urea amount (wt %) | | 0.15 | 0.30 | 0.30 | 0.15 | 0.30 | 0.30 | 0.15 | 0.15 | 0.30 |
| Apparent volume (cm$^3$) | | $2.2 \times 10^{-2}$ | $2.2 \times 10^{-2}$ | $2.2 \times 10^{-2}$ | $2.2 \times 10^{-2}$ | $2.2 \times 10^{-2}$ | $2.2 \times 10^{-2}$ | $2.2 \times 10^{-2}$ | $2.2 \times 10^{-2}$ | $2.2 \times 10^{-2}$ |
| Thickness to outer diameter (%) | | 12.5 | 12.5 | 12.5 | 12.5 | 12.5 | 12.5 | 12.5 | 12.5 | 12.5 |
| Configuration | | Tube | Tube | Tube | Tube | Tube | Tube | Tube | Tube | Tube |
| Material density (g/cm$^3$) | | 0.98 | 0.98 | 0.98 | 0.98 | 0.98 | 0.98 | 0.98 | 0.98 | 0.98 |
| Apparent density (g/cm$^3$) | | 0.92 | 0.95 | 0.97 | 0.98 | 0.97 | 0.98 | 0.97 | 0.97 | 0.90 |
| Continuous cell volume ratio (%) | | 34 | 41 | 46 | 54 | 52 | 58 | 66 | 64 | 26 |
| Open cell volume ratio (%) | | 26 | 34 | 58 | 76 | 60 | 72 | 73 | 59 | 27 |
| Formability | | ◯ | ◯ | ◯ | ◯ | ◯ | ◯ | Δ | Δ | ◯ |
| Fluidity | | ◯ | ◯ | ◯ | ◯ | ◯ | ◯ | ◯ | ◯ | Δ |

EXAMPLE 1

As shown in Table 1, 10 parts by weight of calcium carbonate as an inorganic filler was added to 100 parts by weight of polypropylene (PP) resin. Further, 0.15 wt % of ADCA having a particle diameter of 3 μm as a higher temperature resolving type foaming agent, 0.15 wt % of DPT having a particle diameter of 1 μm as a lower temperature resolving type foaming agent and 0.15 wt % of urea as a blowing assistant were also added to prepare a carrier resin composition.

Figure 5:
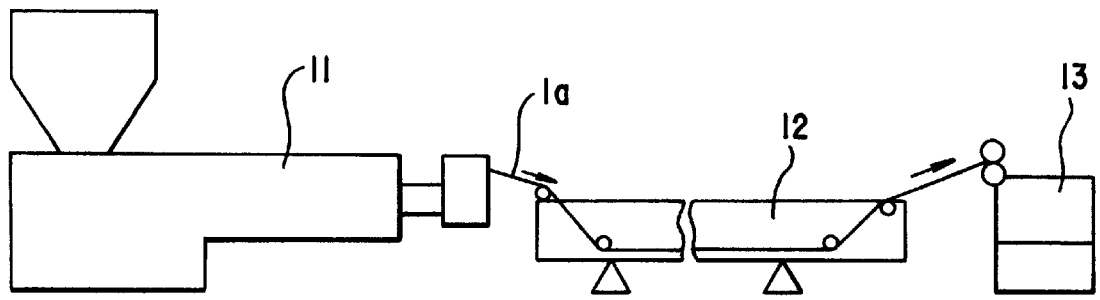
FIG. 5 is a schematic side view showing a carrier manufacturing device for manufacturing the carrier according to the present invention.

Also, a carrier manufacturing device was prepared. As shown in FIG. 5, the device include a single axis extruder 11 having a full flighted screw with a 40 mm diameter and a ratio of L/D of 32, a cooling vessel 12 for cooling the extruded foamed article 1a from the extruder 11 and a pelletizer 13 for pelletizing the extruded article 1a cooled by the cooling vessel 12.

The above-mentioned resin composition then is formed into a tube-shaped extruded foamed article 1a, i.e., carrier, having a 4 mm outer diameter, 0.5 mm thickness and 4 mm length by the carrier manufacturing device.

The standard condition of the extrusion was that the screw rotational speed was 30 rpm, the cylinder temperature was 200–250° C., the die temperature was 250° C., but the conditions were changed in accordance with the state of the formed article.

About the thus obtained carrier, the material density (g/cm$^3$), apparent density (g/cm$^3$), apparent volume (cm$^3$), continuous cell volume ratio (%), and open-cell volume ratio (%) were measured by the following methods.

(1) Material density

A composition combining a PP resin with an inorganic filler was mulled by a "RABOPURASUTOMIRU"(a heat melting state measuring experiment device made by NIPPON SEIKOH SYA), and the composition was pressed to be a square plate, each side having a 100 mm length. Then, the density was measured from the weight and the thickness.

(2) Apparent density

The apparent density was measured by a gas-replacing type density meter. Therefore, this density corresponds to the density of a foamed article from which a continuous cell volume was deducted.

(3) Apparent volume

The apparent volume was measured based on the above apparent density and weight. Therefore, this volume corresponds to the volume of a carrier from which continuous cells volume was deducted.

(4) Continuous cell volume ratio (porous ratio)

Through an electron microscope, the size of a continuous cell per unit area was measured to obtain the volume, and then the continuous cell volume ratio was calculated from the volume.

(5) Open-cell volume ratio

Through an electron microscope, the size of a continuous cell per unit area are measured to obtain the volume, and then the open-cell volume ratio was calculated from the volume and the continuous cell volume.

EXAMPLES 2–9

Resin components shown in Table 1 were formed in the same manner as described in Example 1 to obtain extruded foamed carriers. Each carrier then was measured in the same manner as described above.

TABLE 2

| Example No. | | 10 | 11 | 12 | 13 | 14 | 15 | 16 | 17 | 18 |
|---|---|---|---|---|---|---|---|---|---|---|
| PP resin amount (parts by weight) | | 100 | 100 | 100 | 100 | 100 | 100 | 100 | 100 | 100 |
| Inorganic filler amount (parts by weight) | | 10 | 10 | 70 | 150 | 10 | 200 | 70 | 400 | 40 |
| ADCA amount (wt %) | 2 μm diameter | — | — | — | — | — | — | — | — | — |
| | 3 μm diameter | 1.00 | 1.00 | 1.00 | 1.00 | — | — | 1.00 | 1.00 | 1.00 |
| | 10 μm diameter | — | — | — | — | 1.00 | — | — | — | — |

TABLE 2-continued

| Example No. | | 10 | 11 | 12 | 13 | 14 | 15 | 16 | 17 | 18 |
|---|---|---|---|---|---|---|---|---|---|---|
| | 14 μm diameter | — | — | — | — | — | 1.00 | — | — | — |
| | 15 μm diameter | — | — | — | — | — | — | — | — | — |
| DPT amount (wt %) | 1 μm diameter | 0.30 | 0.30 | 0.30 | 0.30 | 0.30 | 0.30 | 0.30 | 0.30 | 0.30 |
| | 8 μm diameter | — | — | — | — | — | — | — | — | — |
| | 10 μm diameter | — | — | — | — | — | — | — | — | — |
| Urea amount (wt %) | | 0.15 | 0.15 | 0.30 | 0.30 | 0.30 | 0.30 | 0.30 | 0.30 | 0.30 |
| Apparent volume (cm$^3$) | | $4.7 \times 10^{-2}$ | $8.6 \times 10^{-3}$ | $2.2 \times 10^{-2}$ | $5.0 \times 10^{-4}$ | 6.0 | $8.0 \times 10^{-4}$ | $2.1 \times 10^{-2}$ | $4.0 \times 10^{-4}$ | $8.0 \times 10^{-2}$ |
| Thickness to outer diameter (%) | | 37.5 | 4.5 | 12.5 | 5.0 | 35.0 | — | — | — | — |
| Configuration | | Tube | Tube | Tube | Tube | Tube | Column | Column | Column | Column |
| Material density (g/cm$^3$) | | 0.98 | 0.98 | 1.24 | 1.60 | 0.98 | 1.82 | 1.24 | 1.93 | 1.12 |
| Apparent density (g/cm$^3$) | | 0.92 | 0.98 | 1.20 | 1.50 | 0.70 | 1.70 | 1.13 | 1.90 | 1.00 |
| Continuous cell volume ratio (%) | | 54 | 68 | 42 | 42 | 20 | 42 | 41 | 69 | 42 |
| Open cell volume ratio (%) | | 21 | 72 | 36 | 21 | 30 | 24 | 22 | 37 | 30 |
| Formability | | ○ | Δ | ○ | Δ | Δ | ○ | ○ | Δ | Δ |
| Fluidity | | Δ | ○ | ○ | Δ | ○ | ○ | ○ | Δ | ○ |

EXAMPLE 10

As shown in Table 2, a carrier was formed to have a thick thickness of 1.5 mm(37.5% of the outer diameter). Then, the carrier was measured in the same manner as described above.

EXAMPLE 11

A carrier was formed to have a thin thickness of 1.5 mm (4.5% of the outer diameter). Then, the carrier was measured in the same manner as described above.

EXAMPLE 12

A carrier was formed to have 70 parts by weight of an inorganic filler and 1.20 g/cm$^3$ of apparent density. Then, the carrier was measured in the same manner as described above.

EXAMPLE 13

A resin composition as shown in Table 2 was formed to obtain a tube-shaped carrier which the apparent density is slightly large but the apparent volume is slightly small. Then, the carrier was measured in the same manner as described above.

EXAMPLE 14

A resin composition as shown in Table 2 was formed to obtain a tube-shaped carrier which the apparent density is slightly small but the apparent volume is slightly large. Then, the carrier was measured in the same manner as described above.

EXAMPLES 15 AND 16

A resin composition as shown in Table 2 was formed to be a non-hollow column-shaped carrier having an outer diameter of 1 mm and a length of 1 mm. Then, the carrier was measured in the same manner as described above.

EXAMPLE 17

A resin composition as shown in Table 2 was formed to obtain a tube-shaped carrier which the apparent density is slightly large but the apparent volume is slightly small. Then, the carrier was measured in the same manner as described above.

EXAMPLE 18

A resin composition as shown in Table 2 was formed to obtain a tube-shaped carrier which the apparent density is slightly small but the apparent volume is slightly large. Then, the carrier was measured in the same manner as described above.

COMPARATIVE EXAMPLES 1–9

Resin compositions as shown in Table 3 were formed to obtain extruded foamed carriers. Then, each carrier was measured in the same manner as described above. As shown in Table 3, each open cell volume ratio of the obtained carrier was below 20%.

TABLE 3

| Comparative Example No. | | 1 | 2 | 3 | 4 | 5 | 6 | 7 | 8 | 9 |
|---|---|---|---|---|---|---|---|---|---|---|
| PP resin amount (parts by weight) | | 100 | 100 | 100 | 100 | 100 | 100 | 100 | 100 | 100 |
| Inorganic filler amount (parts by weight) | | 10 | 10 | 10 | 10 | 10 | 10 | 10 | 70 | 200 |
| ADCA amount (wt %) | 3 μm diameter | 0.10 | 0.30 | 0.30 | 1.50 | 0.15 | 1.50 | — | 1.00 | 1.00 |
| | 15 μm diameter | — | — | — | — | — | — | 1.50 | — | — |
| DPT amount (wt %) | 1 μm diameter | 0.15 | 0.10 | 0.15 | 0.15 | 0.40 | 0.30 | — | 0.30 | 0.30 |
| Urea amount (wt %) | | 0.15 | 0.15 | 0.10 | 0.15 | 0.15 | 0.40 | 0.40 | 0.30 | 0.30 |
| Apparent volume (cm$^3$) | | $2.2 \times 10^{-2}$ | $2.2 \times 10^{-2}$ | $2.2 \times 10^{-2}$ | $2.2 \times 10^{-2}$ | $2.2 \times 10^{-2}$ | $2.2 \times 10^{-2}$ | $2.2 \times 10^{-2}$ | $1.9 \times 10^{-3}$ | $5.0 \times 10^{-2}$ |
| Thickness to outer diameter (%) | | 12.5 | 12.5 | 12.5 | 12.5 | 12.5 | 12.5 | 12.5 | 4.0 | — |
| Configuration | | Tube | Tube | Tube | Tube | Tube | Tube | Tube | Tube | Column |
| Material density (g/cm$^3$) | | 0.98 | 0.98 | 0.98 | 0.98 | 0.98 | 0.98 | 0.98 | 1.24 | 1.62 |
| Apparent density (g/cm$^3$) | | 0.74 | 0.81 | 0.81 | N/A* | N/A* | 0.65 | 0.91 | N/A* | 0.98 |
| Continuous cell volume ratio (%) | | 12 | 16 | 22 | N/A* | N/A* | 8 | 29 | N/A* | 8 |

TABLE 3-continued

| Comparative Example No. | 1 | 2 | 3 | 4 | 5 | 6 | 7 | 8 | 9 |
|---|---|---|---|---|---|---|---|---|---|
| Open cell volume ratio (%) | 0 | 5 | 0 | N/A* | N/A* | 0 | 18 | N/A* | 0 |
| Formability | ○ | ○ | ○ | x | x | ○ | ○ | x | ○ |
| Fluidity | x | x | x | N/A* | N/A* | x | x | N/A* | x |

Note: N/A* denotes: Unable to measure

Evaluation of the invention and comparative example

Each carrier obtained by the above-mentioned method was evaluated as follows.

(1) Formability

By the above-mentioned extruder, when a foamed article with high quality was obtained, the evaluation was denoted as "○"; when a foamed article with an acceptable quality was obtained, the evaluation was denoted as "Δ"; when a foamed article with an unacceptable quality was obtained, even if the extrusion conditions were changed, the evaluation was denoted as "x".

(2) Fluidity

In a water tank having a diameter of 20 cm and a height of 40 cm, water of 5 liters and cerriers of 0.5 liters were placed, and then air-seasoning was performed from the bottom of the tank at the ratio of 3 liters per minute. As a result, within one week, when the carriers were evenly fluidized, the evaluation was denoted as "○"; when the carries were fluidized, though the fluidity is inferior, such that sewage treatment can be put in practical use, the evaluation was denoted as "Δ"; when the carries were not fluidized or were not evenly fluidized, the evaluation was denoted as "x".

Each evaluation was shown in Tables 1, 2 and 3.

As understood from the above evaluations, a carrier according to the present invention is superior in fluidity and formability. Especially, the carriers of Examples 3 and 4 in which the open-cell volume ratio is 50% or more were evenly fluidized at an early stage after being thrown into a tank. As shown in Examples 7–9, if the particle diameter of the foamed article is slightly small or large, the carrier is inferior in formability, but it was possible to obtain a certain fluidity. A carrier having a thick thickness as shown in Example 10 is inferior in fluidity, but it was possible to put in practical use. A carrier having a thin thickness as shown in Example 11 is inferior in formability, but it was possible to obtain good fluidity. As shown in Examples 13, 14, 17 and 18, the apparent density or the apparent volume is slightly large or small, the performance may be slightly inferior, but it may be possible to put in practical use.

On the contrary, the comparison carrier whose open cell volume ratio is below 20% (i.e., comparative examples 1–9), can not evenly be fluidized one week after being thrown into a tank, resulting in poor water-familiarity and poor fluidity.

As described above, according to the microorganism holding carrier for fluidized bed of the present invention, because the continuous cell volume ratio falls within a range of from 20% to 70% and the open cell volume ratio in the continuous cells is 20% or more, water can smoothly permeate into a number of the open-cells and the semi-open cells, the carrier is superior in water-familiarity, thereby enabling it to obtain quick and excellent fluidity. Because the carrier according to the present invention is a synthetic resin extruded foamed article, the carrier can be made by an extrusion forming method which is suitable for mass production, thus reducing the manufacturing cost. Because the carrier according to the present invention is composed of a polyolefin resin as a main component, the carrier is superior in abrasion resistance and has sufficient durability. Further, the carrier can be disposed without causing any trouble and can reduce harmful influence on the environment by disposing of the spent carriers.

In the present invention, a carrier having a specific characteristic and configuration has a merit such that it can obtain the above-mentioned effects more surely.

Though preferred embodiments according to the present invention are described, it should be recognized that various modifications are possible within the scope of the present invention.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. A microorganism holding carrier for use in a fluidized bed, comprising:

an extruded foamed article having continuous cells and independent cells, said article being composed of a polyolefin resin as a main component, wherein said continuous cells include full-open-cells and semi-open-cells, each of said full-open-cells penetrating through said extruded foamed article to have at least two openings at a surface of said extruded foamed article, and each of said semi-open-cells having only one opening at said surface of said extruded foamed article, wherein a ratio of a total volume of said continuous cells to a total volume of said extruded foamed article falls within a range of from 20% to 70%, and wherein a ratio of the total volume of said full-open-cells to a total volume of said continuous cells is 20% or more.

2. The microorganism holding carrier for use in a fluidized bed as recited in claim 1, wherein an apparent density of said extruded foamed article falls within a range of from 0.90 to 1.80 g/cm$^3$, wherein the apparent density is a density of said extruded foamed article from which the total volume of said continuous cells is deducted.

3. The microorganism holding carrier for use in a fluidized bed as recited in claim 1, wherein an apparent density of said extruded foamed article falls within the range of from 0.90 to 1.40 g/cm$^3$, the apparent density being a density of said extruded foamed article from which the total volume of said continuous cells is deducted, and wherein said extruded foamed article is formed in the shape of a tube.

4. The microorganism holding carrier for use in a fluidized bed as recited in claim 2, wherein the apparent density falls within a range of from 0.90 to 1.40 g/cm$^3$, and wherein said extruded foamed article is formed in the shape of a tube.

5. The microorganism holding carrier for use in a fluidized bed as recited in claim 3, wherein an outer diameter of said extruded foamed article is from 2 to 20 mm, and wherein a thickness of said extruded foamed article is 5 to 30% of the outer diameter.

6. The microorganism holding carrier for use in a fluidized bed as recited in claim 4, wherein an outer diameter of said extruded foamed article is from 2 to 20 mm, and wherein a thickness of said extruded foamed article is 5 to 30% of the outer diameter.

7. The microorganism holding carrier for use in a fluidized bed as recited in claim 5, wherein an apparent volume of said extruded foamed article falls within the range of from $2.0 \times 10^{-3}$ to 5.0 cm$^3$, wherein the apparent volume is a volume of said extruded foamed article from which a volume of said continuous cells is deducted.

8. The microorganism holding carrier for use in a fluidized bed as recited in claim 6, wherein an apparent volume of said extruded foamed article falls within the range of from $2.0 \times 10^{-3}$ to 5.0 cm$^3$, wherein the apparent volume is a volume of said extruded foamed article from which a volume of said continuous cells is deducted.

9. The microorganism holding carrier for use in a fluidized bed as recited in claim 1, wherein an apparent density of said extruded foamed article falls within a range of from 1.10 to 1.80 g/cm$^3$, the apparent density being a density of said extruded foamed article from which the total volume of said continuous cells is deducted, and wherein said extruded foamed article is a non-hollow article.

10. The microorganism holding carrier for use in a fluidized bed as recited in claim 2, wherein the apparent density falls within the range of from 1.10 to 1.80 g/cm$^3$, and wherein said extruded foamed article is a non-hollow article.

11. The microorganism holding carrier for use in a fluidized bed as recited in claim 9, wherein an apparent volume of said extruded foamed article falls within a range of from $5.0 \times 10^{-4}$ to $4 \times 10^{-2}$ cm$^3$, wherein the apparent volume is a volume of said extruded foamed article from which a volume of said continuous cells is deducted.

12. The microorganism holding carrier for use in a fluidized bed as recited in claim 10, wherein an apparent volume of said extruded foamed article falls within a range of from $5.0 \times 10^{-4}$ to $4 \times 10^{-2}$ cm$^3$, wherein the apparent volume is a volume of said extruded foamed article from which a volume of said continuous cells is deducted.

13. The microorganism holding carrier for use in a fluidized bed as recited in claim 9, wherein said extruded foamed article is formed in a shape of a column.

14. The microorganism holding carrier for use in a fluidized bed as recited in claim 10, wherein said extruded foamed article is formed in a shape of a column.

15. The microorganism holding carrier for use in a fluidized bed as recited in claim 11, wherein said extruded foamed article is formed in a shape of a column.

16. The microorganism holding carrier for use in a fluidized bed as recited in claim 12, wherein said extruded foamed article is formed in a shape of a column.

* * * * *